United States Patent [19]
Yoshida et al.

[11] 4,086,940
[45] May 2, 1978

[54] HYDRAULIC POWER-STEERING SYSTEM FOR VEHICLES

[75] Inventors: Hiroshi Yoshida, Toyokawa; Hajime Kozuka, Okazaki, both of Japan

[73] Assignee: Mitsubishi Jidosha Kogyo Kabushiki Kaisha, Japan

[21] Appl. No.: 669,968

[22] Filed: Mar. 24, 1976

[30] Foreign Application Priority Data

Apr. 5, 1975 Japan .................................. 50-40794
Apr. 15, 1975 Japan ............................. 50-51040[U]
May 10, 1975 Japan .................................. 50-56509

[51] Int. Cl.² .............................................. F15B 9/10
[52] U.S. Cl. .............................. 137/625.69; 91/375 A
[58] Field of Search .................. 91/375 A, 375 R, 370, 91/371, 372, 373; 137/625.69

[56] References Cited

U.S. PATENT DOCUMENTS

| | | | |
|---|---|---|---|
| 3,630,233 | 12/1971 | Miyamoto | 91/375 A |
| 3,667,346 | 6/1972 | Duffy | 91/375 A |
| 3,693,470 | 9/1972 | Masuyama | 91/375 A |
| 3,832,936 | 9/1974 | Adams | 91/375 A |
| 3,855,904 | 12/1974 | Jablonsky | 91/372 |
| 3,921,669 | 11/1975 | Goff | 91/375 A |

*Primary Examiner*—Paul E. Maslousky
*Attorney, Agent, or Firm*—Robert E. Burns; Emmanuel J. Lobato; Bruce L. Adams

[57] ABSTRACT

A hydraulic power-steering system for vehicles, comprises a hydraulic directional control mechanism interposed between an input shaft and an output shaft. A rotor provided in the housing of said hydraulic directional control mechanism without receiving any hydraulic reaction, rotates integrally with said output shaft, and a spool valve is fitted in said rotor to perform directional control of hydraulic fluid flowing from a pump to a steering cylinder. An input pin fixed to said input shaft circularly rotates in order to drive said spool valve and also serves as a stopper pin for engaging said input shaft with said output shaft directly when manually steering.

2 Claims, 4 Drawing Figures

HYDRAULIC POWER-STEERING SYSTEM FOR VEHICLES

BACKGROUND OF THE INVENTION

This invention relates to a hydraulic power-steering system for vehicles comprising hydraulic directional control mechanism between the input and output shafts of the steering shaft of a vehicle.

In a conventional system of this type, as illustrated in FIG. 3, an input shaft 103 is connected, through a torsion bar 102, to a rotor 101 formed integrally with an output shaft 100. A spool valve 104 is shifted either right or left from the neutral position, depending on the angle formed by relative rotation of the input and output shafts 103 and 100. By the shifting of the spool valve 104, hydraulic working fluid, which is usually introduced through a fluid-supply port 105 and discharged through a return port 106, is supplied to the steering power cylinder through either of output fluid passages 107 and 108.

However, in such a system, the working fluid shifted by the spool valve 104 is introduced to the steering power cylinder through a pressure-oil chamber 109 that is kept in contact with an end surface of the rotor 101. Due to this structure, thrust is exerted on the rotor 101 when the pressure in the pressure-oil chamber 109 becomes high. Here arises a problem that a thrust bearing 110 must be provided to receive reaction working on the rotor 101.

Also, since the pressure-oil chamber 109 lies at an intermediate point of the output fluid passage 107, the rotor 101 cannot readily be separated from the output shaft 100. This results in difficult assembling and disassembling, and higher manufacture cost.

Further, the conventional power-steering system, in general, necessitates providing a stopper pin to restrict the relative rotation of the input and output shafts in a limited space, which makes the construction of the system complex. As a consequence, the system becomes less strong as well as more difficult to manufacture.

SUMMARY OF THE INVENTION

The object of this invention is to eliminate the aforesaid shortcomings through the provision of a system in which the rotor is fitted in a simpler manner and kept free from the reaction, and an input pin, which is adapted to drive the spool valve to perform directional control of the hydraulic fluid flowing to the steering power cylinder, is made to serve also as the stopper pin, by designing that portion of the input pin so as not to occupy any large space where it is connected to the spool valve and imparting enough strength to serve the double purpose.

To achieve this purpose, a hydraulic power-steering system for vehicles according to this invention has a feature that there are provided, in the housing of hydraulic directional control mechanism interposed between an input shaft and output shaft making up a steering shaft of a vehicle, a rotor adapted to rotate integrally with the output shaft, a spool valve fitted in the rotor to perform directional control of hydraulic fluid flowing from a hydraulic pump to a steering cylinder, and an input pin that is fixed to the input shaft at the base end thereof and adapted to circularly rotate with the rotation of the input shaft, wherein the rotor is perforated with a communication passage to intercommunicate with oil chambers at both ends of the rotor, the input pin is inserted in the communication passage leaving a given annular space therearound, and the extremity of the input pin is engaged with the spool valve so as to drive it.

The hydraulic power-steering system of this invention has another feature that the large-diameter portion of the input pin is inserted in the communication passage leaving a given annular space therearound, and the extremity thereof with a reduced diameter is engaged with the spool valve.

The hydraulic power-steering system of this invention has still another feature that the rotor is serration- or spline-connected to the output shaft.

DESCRIPTION OF THE PREFERRED EMBODIMENTS

Figure 1:
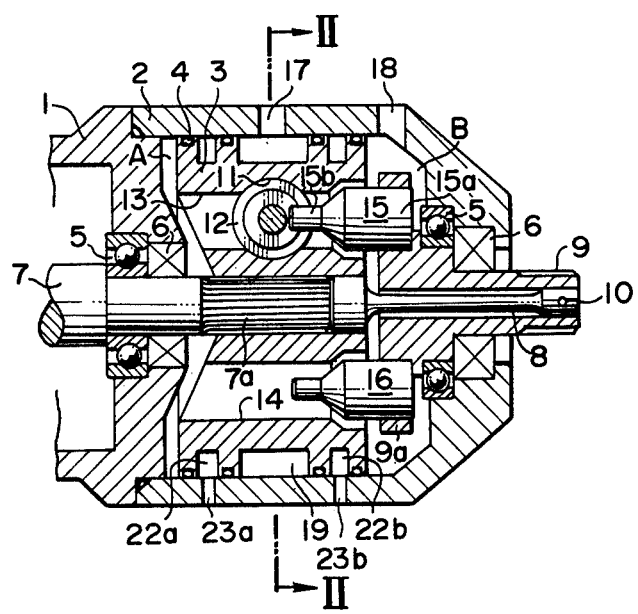
FIG. 1 is a longitudinal cross sectional view of the hydraulic directional control mechanism according to the present invention.
Figure 2:
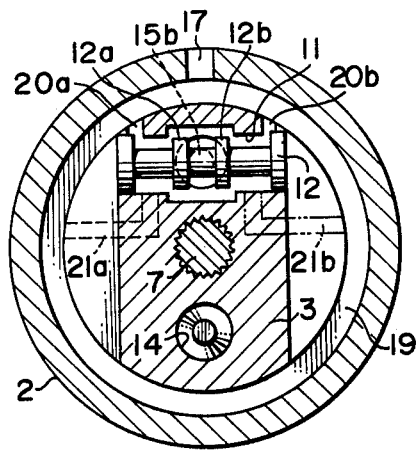
FIG. 2 is a transverse cross sectional view of the hydraulic directional control mechanism taken along the line II—II shown in FIG. 1.
Figure 3:
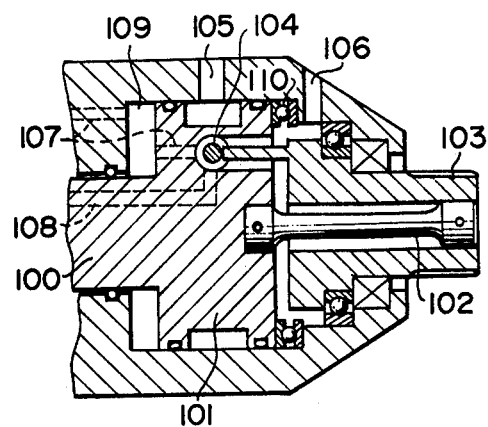
FIG. 3 is a longitudinal cross sectional view of a hydraulic directional control mechanism known in the art.

Now a hydraulic power-steering system for vehicles embodying this invention will be described with reference to the accompanying drawings, in which: FIG. 1 is a longitudinal cross section showing hydraulic directional control mechanism that is a principal portion of a first embodiment of the invention. FIG. 2 is a cross-sectional view looking in the direction of the arrow from the line II—II of FIG. 1. In a space defined by a gear box 1 fixed to the vehicle frame and a housing 2 fitted thereto, there is provided a rotor 3, rotatably, with seals 4 disposed between the rotor 3 and the interior wall of the housing 2. Oil chambers A and B are provided at both ends of the rotor 3.

On the left of the rotor 3, an output shaft 7 extends from within the gear box 1 into the housing 2, through a bearing 5 and an oil seal 6, with an end 7a thereof being serration- or spline-connected to a hole at the center of the rotor 3.

Meanwhile, on the right of the rotor 3, a torsion bar 8, whose left end is fixed at the center thereof, extends rightward into a hollow space in an input shaft 9 that is fitted to the housing 2 through a bearing 5 and an oil seal 6, with the right end thereof being fixed by a pin 10.

The rotor 3 is formed inside with a pilot-valve bore 11, at right angles with the axis of its rotation, in which a spool valve 12 is slidably fitted, a communication passage 13 that intersects the pilot-valve bore 11 and intercommunicates with the oil chambers A and B, and another communication passage 14 is at a position substantially symmetrical thereto with respect to the axis of rotation.

Into a flange portion 9a formed at the left end of the input shaft 9 is inserted the right portion of a large-diameter portion 15a of an input pin 15. While, the left portion thereof extends into the communication passage 13 leaving a given annular space therearound, and, through a tapered portion, reduced to a small-diameter extremity 15b, which is fitted between two spool lands 12a and 12b formed at the center of the spool valve 12.

Also, at such a position of the flange portion 9a that is substantially symmetrical to the input pin 15 with respect to the axis of rotation thereof, there is fitted a large-diameter portion of a stopper pin 16, whose left-hand portion is inserted into the communication passage 14 leaving a given annular space therearound.

The housing 2 is perforated with an oil supply port 17 and a return port 18. On the circumference of the rotor 3 are formed an annular groove 19 that communicates with the oil supply port 17, and a pair of ports 20a and 20b, at the right and left, communicating with the pilot valve bore 11.

Pressure-oil ports or passsages 21a and 21b open in the pilot valve bore 11, corresponding to the ports 20a and 20b and communicating with annular grooves 22a and 22b formed along the circumference of the rotor 3.

Further, the housing 2 is provided with fluid flow ports 23a and 23b that communicate with the annular grooves 22a and 22b, respectively, to introduce working fluid to a steering cylinder not shown. The annular circumferential groove 19, the pair of ports 20a, 20b, the spool valve 12 within the valve bore 11, the pair of pressure ports 21a, 21b, and the pair of annular grooves 22a, 22b together comprise valve means for controlling a flow of working fluid between the fluid supply port 17 and a selected one of the fluid flow ports according to a position of the spool valve 12 within the valve bore 11.

In the system of the above-described construction, the working fluid fed from a pump, not shown, flows through the oil supply port 17 into the annular groove 19, and then circularly back to the pump, passing through the ports 20a and 20b, the pilot valve bore 11, the communication passage 13, and the return port 18.

Meanwhile, the communication passages 13 and 14 introduce the working fluid to the oil chambers A and B disposed at both ends of the rotor 3, thereby establishing a hydraulic balance in the axial direction of the rotor 3.

When the input shaft 9 is rotated during driving by the operation of a steering wheel, not shown, the torsion bar 8 is twisted initially, and the rotor 3 does not move. Consequently, the input pin 15 moves circularly with respect to the rotor 3, thus causing the spool valve 12 of the open-center type to slide within the pilot valve bore 11.

This displacement of the spool valve 12 controls the hydraulic fluid inside the pilot valve bore 11. Then the working fluid is delivered through the pressure-oil ports 21a and 21b, annular grooves 22a and 22b, fluid flow ports 23a and 23b, into the steering power cylinder, thus performing a power-steering function corresponding to each steering-wheel input.

At the same time, when the input shaft 9 is rotated by the operation of the steering wheel, the torsion bar 8 is twisted, and the input pin 15 and stopper pin 16 simultaneously are allowed to rotate and undergo displacement with respect to the rotor 3, within the limit of the given spaces respectively left between them and the communication passages 13 and 14. Namely, the input pin 15 and stopper pin 16 are both provided with a function to prevent the relative rotational displcement of the input shaft 9 and the output shaft 7 formed integrally with the rotor 3 that exceeds a predetermined limit.

Accordingly, it is also possible to control the direction of a vehicle by turning the output shaft 7 with only the rotating force of the hand-operated input shaft 9 through the input pin 15 and stopper pin 16 that are imparted with the stopper function as described above.

More specifically, the input pin 15 is provided with a combination of a function to drive the spool valve 12 and a stopper function to integrally rotate the input shaft 9 and the output shaft 7, in the hydraulic directional control mechanism interposed between the input and output shafts 9 and 7. Because it is a simple rod-shaped bar, it is easy to make. Besides it is easy to assemble, too, as it requires no more than press-fitting into a hole in the flange 9a of the input shaft 9 and so on.

Formed with the large-diameter portion 15a and small-diameter extremity 15b, withthe tapered portion therebetween, their input pin 15 can perform the aforesaid two functions more efficiently in a limited space. Because the large-diameter portion 15a that performs the stopper function has a high rigidity, it is capable of not only effectively transmitting the strong turning force of the steering wheel, but also preventing oscillation of the hydraulic circuit or other similar phenomenon that might arise when the rigiditly of the pin is insufficient. On the other hand, the small-diameter extremity 15b is suited for effectively driving the spool valve 12, which necessitates no great power, in the limited space.

Both the input pin 15 and stopper pin 16 are required to simultaneously come in contact with the interior wall of the communication passages 13 and 14, respectively, when their relative rotational displacement with respect to the rotor 3 exceeds the predetermined value. To achieve this successfully, the involved components must be made with a high degree of accuracy. The required accuracy, however, can be obtained easily, since all the component parts concerned are circularly machined.

Figure 4:
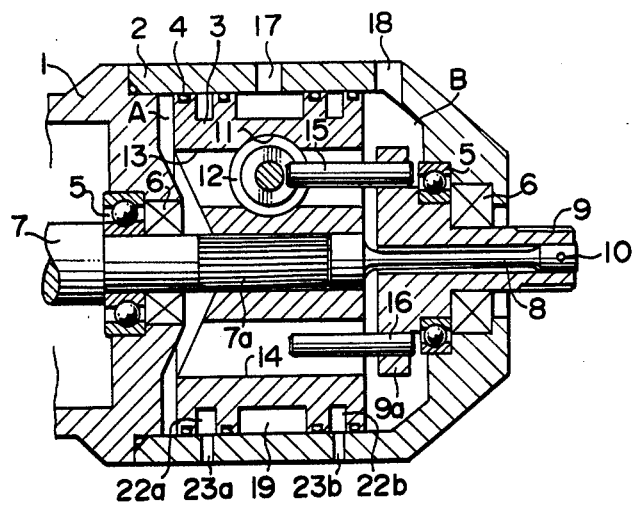
FIG. 4 is a longitudinal cross sectional view of another embodiment of the hydraulic directional control mechanism according to the present invention.

FIG. 4 is a longitudinal cross-sectional view similar to FIG. 1, but showing a second embodiment of this invention. The input pin 15 and stopper pin 16 of this embodiment are straight, round bars, for the purpose of structural simplification. But this second embodiment can also achieve the operation and result comparable to those of the above-described first embodiment.

As understood from the detailed description given above, the hydraulic power-steering system according to this invention is capable of facilitating provision of the rotor between the input and output shafts, establishing a balance between the hydraulic pressures working on both sides of the rotor by means of the communication passsages formed therein, imparting the input pin, adapted to drive the spool valve, also with the function of the stopper pin to control the range of the relative rotation between the input and output shafts, and increasing the strength of the input shaft to the desired degree in the limited space. Moreover, this invention offers the advantage that the system can be manufactured and assembled with remarkably increased efficiency.

What is claimed is:

1. A hydraulic directional control mechanism, comprising:

a cylindrical rotor for rotating about a longitudinal axis having a pair of opposed ends, a passage extending axially therethrough and opening at each of said ends, and a valve bore intersecting the passage at right angles to the axis of rotation;

a housing having a cylindrical interior space with said cylindrical rotor disposed therein, wherein the housng interior is dimensioned to form a close fit with said rotor to permit rotation thereof when a sufficiently strong torque is applied to said rotor and to form respective fluid chambers within the housing interior opposite respective ends of said rotor, wherein the respective fluid chambers are in communication through the passage and are thereby maintained at an equal pressure for preventing axial force imbalance on said rotor caused by fluids within the chambers, and said housing having a fluid supply port adjacent said rotor for introducing a working fluid into said housing, a pair of fluid flow ports adjacent said rotor and a return port communicating with one of said fluid chambers for discharging fluid from said housing;

valve means, comprising a spool valve disposed within said valve bore and fluid conduits between the fluid supply port and the valve bore and between the valve bore and the fluid flow ports, for controlling a flow of working fluid between the fluid supply port and a selected one of the fluid flow ports according to a position of said spool valve within the valve bore, wherein the fluid chambers defined within said housing at respective ends of said rotor are always in communication with each other through the passage extending through said rotor and the valve bore intersecting the passage;

an input shaft mounted on said housing for rotation coaxially with said rotor and having an end portion within said housing;

a pin mounted on said end portion of said input shaft and extending into said passage and having a tapered end portion engaging said spool valve to position the same within the valve bore, whereby rotation of said input shaft effects displacement of said pin and positions said spool valve within said bore until said input shaft is sufficiently rotated so that said pin contacts a wall of said passage whereupon further rotation of said input shaft is effective to rotate said rotor with said pin extending into said passage and bearing against the passage wall;

a torsion bar connected between said rotor and said input shaft coaxially with their respective axes of rotation and having a torsional stiffness for permitting said torsion bar to twist as said input shaft rotates relative to said rotor without rotating said rotor before said pin engages the wall of said passage through said rotor, and an axial bore extending into said rotor and having internal splines or serrations for coupling said rotor to an output shaft.

2. A hydraulic directional control mechanism according to claim 1, wherein the fluid conduits between the fluid supply port and the valve bore comprises an annular circumferential groove in a lateral surface of said rotor adjacent the fluid supply port, and a pair of ports through said rotor between the annular circumferential groove and the valve bore, wherein the fluid conduits between the valve bore and the fluid flow ports comprise a pair of annular circumferential grooves in the lateral surface of the rotor each adjacent a respective one of the fluid flow ports, and a pair of pressure passages through said rotor and each connecting a respective one of said pair of annular circumferential grooves with said valve port, and wherein said spool valve is dimensioned to block selected one of the pressure passages or neither of the pressure ports according to its position within the valve bore for controlling a flow of working fluid between the fluid supply port and a selected one of the fluid flow ports.

* * * * *